United States Patent [19]
Ziegler et al.

[11] 3,880,704
[45] Apr. 29, 1975

[54] METHODS AND COMPOSITIONS TO ENHANCE TALL OIL SOAP SEPARATION FROM WASTE PULPING LIQUOR

[75] Inventors: Robert J. Ziegler, Churchville; Hillel Lieberman, Warminster, both of Pa.

[73] Assignee: Betz Laboratories, Inc., Trevose, Pa.

[22] Filed: July 16, 1973

[21] Appl. No.: 379,285

[52] U.S. Cl. .................. 162/16; 162/29; 252/61; 252/DIG. 1; 260/97.7
[51] Int. Cl. ............................................ D21c 11/04
[58] Field of Search...... 162/16, 29, 42; 159/47 WL; 260/97.5, 97.7; 106/123 TQ; 252/60, 367, 368, 369, 61, DIG. 1

[56] References Cited
UNITED STATES PATENTS

| 2,164,063 | 6/1939 | Handy ................................. 252/61 |
| 2,322,820 | 6/1943 | Brown .......................... 252/DIG. 1 |
| 2,362,432 | 11/1944 | Cahn ................................ 252/61 X |
| 2,698,088 | 12/1954 | Pryor et al. ...................... 252/61 X |
| 2,904,585 | 9/1959 | Doerr et al. ................... 252/DIG. 1 |
| 3,102,114 | 8/1963 | Komori et al. ................ 252/DIG. 1 |
| 3,138,580 | 6/1964 | Baxley et al. ................. 260/97.7 X |
| 3,141,012 | 7/1964 | O'Boyle ........................ 260/97.7 X |
| 3,449,313 | 6/1969 | Bolger et al. ..................... 260/97.5 |
| 3,578,628 | 5/1971 | Chun et al. ......................... 260/97.7 |

Primary Examiner—S. Leon Bashore
Assistant Examiner—Alfred D'Andrea, Jr.
Attorney, Agent, or Firm—Alexander D. Ricci

[57] ABSTRACT

The present disclosure is directed to methods and compositions for enhancing tall oil soap recovery during the concentration of a black liquor derived from kraft or sulfate pulping processes. The methods basically provide for the addition to the black liquor of an effective amount of compositions comprising combinations of a water-insoluble organic liquid, an ester of a polyethylene glycol, a petroleum sulfonic acid, a tallow fatty acid and/or tallow fatty alcohol, and a product derived by the esterification of an ethoxylated (5–40) moles sugar alcohol with an unsaturated $C_{14}$–$C_{20}$ fatty acid, or mixtures thereof optionally but beneficially a lower alkanol solubilizing agent.

14 Claims, No Drawings

METHODS AND COMPOSITIONS TO ENHANCE TALL OIL SOAP SEPARATION FROM WASTE PULPING LIQUOR

BACKGROUND OF THE INVENTION

Tall oil soap from which tall oil is produced is a major by-product of the kraft or sulfate (alkaline) pulping process. The alkaline pulping of soft wood produces or liberates fatty acids, resin acids and unsaponafiable compounds which until converted to tall oil, exists as sodium salts of soaps (tall oil soaps) that are carried with the black liquor from the pulp washing systems to the evaporators. As is well-known, the spent black liquors are concentrated in multiple-effect evaporators in various stages to a degree suitable for burning and the recovery of various inorganic chemicals.

As the total solids content is increased by evaporation to about 18 to 30% solids, the tall oil soap rises to the surface of the liquor. The soap is then skimmed mechanically from the surface in a skimming operation carried out in a tank which receives the liquor from, usually the fourth effect of the evaporators and returns the liquor to the third. Because of the evaporation economies and the amount of black liquor concentrated, it is necessary to maintain the operation as continuous as possible with the objective of separating as much tall oil soap as possible.

Because of the current great demand for crude tall oil, mills are extremely interested in new methods or techniques for improving the recovery of crude tall oil. Accordingly, any improvement in the recovery efficiency of tall-oil soap from the black liquors would, of course, result in increased yields of crude tall oil. At present it is estimated that approximately 75% of the total crude tall oil potential from a ton of pine chips is recovered while 25 percent is lost with the underflow from the soap skimmer. At current market values of $110 per ton, the loss represents an annual loss in revenue to pine-kraft mills of approximately sixteen million dollars. Previously conducted studies have indicated that the non-recoverable tall oil soap remains dissolved or suspended in the liquor leaving the soap skimmer. Accordingly it was the present inventors' objective to provide a composition and/or a method for improving the efficiency of the tall oil soap recovery operation to thereby avoid the loss of dissolved and/or suspended tall oil soap.

GENERAL DESCRIPTION OF THE INVENTION

The present inventors discovered that enhanced recovery of tall oil soap can be achieved using an effective amount of a composition comprising on a weight ratio basis:

i. from about 0.1% to about 15% of a product derived by the esterification of an ethoxylated sugar alcohol (5 to 40 moles of ethylene oxide per mole of sugar) by an unsaturated $C_{14} - C_{20}$ fatty acid or mixture thereof, ii. from about 0.5% to about 30% of at least one tallow fatty acid, or tallow fatty alcohol, having about 12 to 20 carbon atoms iii. a material in the weight ration specified selected from the group consisting of;
   a. from about 0.1% to about 15% of a fatty acid mono or diester of a polyethylene glycol, such fatty acid having from about 14 to 18 combinations,
   b. from about 0.3% to about 20% of a petroleum sulfonic acid, or water soluble salt thereof having a molecular weight of from about 400 to 900, and
   c. mixtures of (a) and (b), each of which is present in the mixture in an amount sufficient to provide the appropriate weight ratio for the compositions; and iv. from about 65 to about 98% of a water-insoluble liquid selected from the group consisting of vegetable oils, aliphatic hydrocarbons, alicyclic hydrocarbons, aromatic hydrocarbons, halogenated aliphatic hydrocarbons, halogenated aromatic hydrocarbons and long chain amines.

The composition may additionally contain from about 0.5% to about 8% and preferably from about 2% to about 6% of a lower alkanol solubilizing agent such as the one to six carbon alcohols i.e. methanol, ethanol, isopropanol and hexanol.

Agents of this nature are used to provide cold temperature stability in those areas and applications which require this feature. The foregoing recitations relative to the composition, although the most effective are not necessarily the only percentages of each that may be utilized. The percentages recited represent the desirable ranges from both effectiveness and economics points of view.

The effective and economic treatment levels for the inventive composition were determined to be within the range of from about 5 to 1000 parts per million parts by weight of the aqueous system, and preferably from about 50 to about 200 parts per million parts of aqueous system (ppm). Although treatment levels above 1000 ppm based upon the weight of system, are quite effective in enhancing tall oil soap recovery, the use of excesses about these levels are prohibitive due to economic considerations. Accordingly the upper treatment level is predicated upon cost considerations rather than limit of effectiveness.

As a further explanation or description of the ingredients of the composition the following will be of help.

The tallow acids are basically the saturated and unsaturated mono and dicarboxylic fatty acids having from about 12 to 24 carbon atoms, and preferably 16 to 18 carbon atoms such as stearic acid, palmitic and oleic acid and mixtures thereof. In many instances the tallow acids as obtained are in fact mixtures of various fatty acids such as mixtures of palmitic, stearic and oleic acids. Likewise the tallow alcohols have from about 12 to 24 but normally from 16 to 18 carbon atoms.

Petroleum sulfonic acids and the metallic salts thereof e.g. calcium, magnesium, potassium and sodium salts, are usually obtained as a by product of white oil manufacturing and lube stock refining, usually by the addition of sulfur trioxide to oils. The molecular weights of these particular derivatives range from about 400 to 900. Products of this type are obtainable under the tradenames of Petronate HL and Calcium Petronate.

The polyethylene glycol derivatives are those esters such as the mono-oleate, dioleate, mono and distearate, mono and dipalmitate esters. Moreover the derivatives may be the "300 to 600" derivatives such as polyethylene glycol 600 dioleate or the polyethylene glycol 300 monoleate. The number which appears after the "polyethylene glycol" in these designations represents the degree of polymerization of the polyethylene glycol. More specifically, this number indicates that the number of ethylene oxide units in the polymer is such as to yield a total molecular weight expressed in the number of the polymer designation.

The esterification products suitable for use in the invention are those which are produced by esterifying under condensing conditions commercially available ethoxylated sugar alcohols with unsaturated fatty acids containing from about 14 to 20, and preferably 16 to 18 carbon atoms, or mixture thereof. Preferably unsaturated acids are utilized, however commercially available fatty acids are in many instances mixtures of fatty acids some of which are in fact saturated. The esterification process may or may not be complete, i.e. complete esterification of all available hydroxyl groups in the ethoxylated sugar alcohol. For example, if ethoxylated sorbitol (the sugar alcohol) and oleic acid (the esterifying acid) are used, the esterification may be controlled so as to obtain ethyoxylated sorbitol monoleate, dioleate, trioleate, tetraoleate, pentaoleate or hexaoleate or mixtures thereof. It should perhaps be explained that all of the esterified forms may be used in accordance with the present invention as well as the esterification products as per the foregoing of ethyoxylated sugar alcohols such as mannitol. As mentioned earlier, the ethyoxylation of the sugar alcohol should be to a degree so as to ensure that from 5 to about 40 moles of ethylene oxide per mole of sugar alcohol are reacted under standard ethoxylation conditions to produce the ethyoxylated sugar alcohol. Obviously the molecular weight of the sugar has been correspondingly increased under these circumstances.

The water-insoluble organic liquids which can be advantageously used in the composition are the vegetable oils, such as the water-insoluble edible oils which are extracted from seeds and which are generally considered to be mixtures of glycerides, the aliphatic hydrocarbons, the alicyclic hydrocarbons and the aromatic hydrocarbons and the halogenated derivatives thereof. These generic descriptions include many type carriers or liquids such as benzene, hexane, octane, mineral hydrocarbons such as the mineral oils (paraffinic oils, napthenic oils, halogenated products thereof and kerosene). Mineral seal oil and similar petroleum fractions, synthetic polymers and halogenated products thereof, such as the liquid triflurovinyl chloride polymers, long chain alcohols such as nonyl alcohol and octyl alcohol, long chain esters such as diglycol laurate, and long chain amines such as octyl amine, nonyl amine and 2-ethyl-amino-heptane. In many instances these liquid carriers are not only water-insoluble but also hydrophobic.

The carrier liquid should be of such nature that its boiling point should be greater than 150°F and its viscosity should be such as to be liquid at room temperature. In the case of mineral hydrocarbons a viscosity of about 30 to 400 SUS (100°F.) has been found to be completely acceptable. From the vast number of water-insoluble liquids evaluated, it would appear that any liquid which possesses the aforementioned properties would be operable.

Spreading agents or surfactants which are commercially available such as sorbitan monostearate and the surfactants, decyl alcohol, silicone oils (Union Carbides L45) and the polyether triols of high molecular weight (Union Carbides LHT42) have been used successfully in the inventive compositions. These agents are generally included where rapid distribution of the composition in a particular system is required.

The composition of the invention can be made simply by mixing the ingredients thoroughly, heating the mixture to a temperature of from about 115° to 150°F. for a time to insure that the ingredients have been dissolved and thoroughly incorporated. The blend is then cooled slowly to 100°F. and at this point other ingredients such as the solubilizing agent may be added. The product is then ready for use. The heating is merely an expedient in the preparation, since products prepared without heating but with longer mixing times operate as effectively.

In order to determine the capacity of the composition of the present invention to enhance soap separation, a test procedure was used which placed the sample black liquor solutions under conditions similar to those experienced in the evaporation-skimming process.

In order to more accurately assimilate the conditions, actual black liquor samples from various alkaline pulping processes were obtained directly from the mills. These black liquor samples were approximately 5–10% in solids consistency. More specifically, the liquor samples are comprised of approximately 90–95% aqueous medium and approximately 0.5% lignins, soaps, resins, etc. The liquors were those which normally would be fed to the evaporators and concentrated to an 18–30, and preferably a 22–25% solids content.

TEST PROCEDURE

The primary objective of the procedure was to simulate as closely as possible the conditions encountered in a functioning evaporation process with respect to the tall oil soap skimming operation. In a normal operation the additive would be added to the black liquor prior to or at the time of its introduction into the first effect of the multiple-effect evaporator, or in any stage after but prior to the skim tank. The most desirable area for additive dosage is the intake side of the skim tank. However advantages such as enhanced heat transfer have been noted where additives have been placed in the first of the multiple effects of the evaporator system. Accordingly, the initial tests were conducted with the desire to simulate that which occurs in the most desirable area for addition of the additive.

Therefore the procedure was as follows:

1. A weak black liquor or skim tank inflow sample diluted at the mill to prevent tall oil soap separation and oxidation (during transit) was placed in a rotary evaporator (Rinco). The samples were heated and water flashed off to obtain a solid content of, typically 22–25%, at a final temperature of 170°–180°F.

2. Portions of this liquid (e.g. 100 cc) were removed from below the surface of any tall oil soap which may have separated, and added to containers containing the additives to be tested.

3. These portions were then held at a temperature of 170°–180°F. for approximately one-half hour with no agitation except for brief initial stirring.

4. Portions of these samples were pipette sampled below the surface of any separated tall oil soap and immediately diluted for Buckeye determination.

The "Buckeye" Method for the Determination of Tall Oil in Sulfate Black Liquor was originally developed by Saltsman and Kuiken and published in TAPPI 42, No. 11 pp. 873–874. By determining the amount of tall oil producible from the various quantities of black liquor sampled, it is possible to ascertain the corresponding amount of tall oil soap contained in the black liquor before and after treatment with the additive.

For the purpose of the present determination the "Modified Buckeye Procedure" described below was utilized.

MODIFIED BUCKEYE PROCEDURE

Reagents:
 18% hydrogen peroxide (3 pts. 30% $H_2O_2$ + 2 pts $H_2O$)
 20% sodium sulfite solution
 1:1 HCl solution
 Buckeye Solvent
  1600 ml. acetone
  1200 ml. petroleum ether
  400 ml. methanol
 Petroleum Ether
 Wash Solvent
  400 ml. acetone
  200 ml. methanol
  200 ml. water
 Isopropyl Alcohol
 Absolute Ethanol
 0.02N methanolic KOH
 1% Thymol Blue in DMF indicator Equipment:
 4-500 ml. separator funnels with stand
 3-10 ml. graduated cylinders
 2-25 ml. graduated cylinders
 1-100 ml. graduated cylinders
 1-500 ml. graduated cylinders
 1-100 ml. pipette
 2-250 ml. Erlenmeyer flasks
 pan
 hot plate
 hood (for evaporation)
 1-25 ml. buret
 oven (for solids det'n.)
 2- evaporating dishes Procedure:
 1. From known data or quick check in the oven get an approximate black liquor solids content.
 2. Dilute the black liquor sample to about 5% solids. Should have at least 400 ml. of diluted sample.
 3. Pipet 100 ml. aliquots of the diluted b.l. into each of two separatory funnels.
 4. Measure out:
  5 ml. 18% peroxide solution
  5 ml. 20% $Na_2SO_3$ solution
  10 ml. 1:1 HCl
 into the three 10 ml. graduated cylinders. To one b.l. sample add the peroxide solution and mix by swirling the liquid in the sep. funnel for 1 minute.
 5. Next add the $Na_2SO_3$ sol'n. and swirl for 1 minute.
 6. Next add the HCl sol'n. and swirl for 1 minute.
 7. Add 400 ml. Buckeye solvent to the sep. funnel. Mix lightly and release the gas pressure. After several cautious mixes, shake vigorously, release pressure, and allow to settle.
 8. Repeat steps 4-7 on the other b.l. sample.
 9. Going back to the first sample, draw off the b.l. layer into the second sep. funnel.
 10. Extract the b.l. with 100 ml. of pet. ether.
 11. Discard the b.l. layer and combine the pet. ether layer with the Buckeye solvent in the first sep. funnel.
 12. Wash 4 or 5 times with 20 ml. each time of the wash solvent.
 13. Add 1 ml. anhydrous ethanol to the washed Buckeye solvent portion at a time into a 250 ml. Erlenmeyer flask. Evaporate to dryness on a water bath in a hood. Heating in a 105°C oven may be necessary to remove the last traces of water.
 14. While first sample is evaporating, repeat steps 10-13 on the second sample.
 15. When the first sample is completely evaporated, add 20–25 ml. of isopropyl alcohol and 1 drop of thymol blue indicator. Titrate with 0.02N methanolic KOH to first definte blue end point.
 16. Repeat for the second sample and also run a blank titration on the Buckeye solvent.
 17. The weight of tall oil can be calculated from:

$$\text{wt. tall oil (g.)} = (\text{ml KOH} - \text{ml. KOH blank}) \times N_{KOH} \times 56.1/172$$

for 0.02N KOH wt. tall oil (g.) = 0.06525 (ml KOH − ml KOH blank)

18. Tall oil is always expressed as per cent on black liquor solids. Weigh two 50 g. samples of diluted b.l. from Step 2 into tared evaporating dishes. Evaporate to dryness overnight in 105°C oven. Reweigh to determine solids content.

$$\%\text{ tall oil on solids bases} = \text{wt. tall oil (g.)} \times 10/\text{g. solids in 10 ml. dil. b.l.}$$

For 20 Buckeye Determinations (40 duplicates) Need:
 200 ml. 18% $H_2O_2$
 200 ml. 20% $Na_2SO_3$ solution
 400 ml. 1:1 HCl
 10 l. acetone
 10 l. pet ether
 3 l. methanol
 1.1 isopropyl alcohol
 1 pt. anhydrous ethanol 1pint of N/10 methanolic KOH would be more than sufficient.

SPECIFIC EXAMPLES

In order to establish the effectiveness of the compositions of the present invention, the following products containing the respective per centages by weight of the particular ingredients were prepared and tested in accordance with the Test Procedure outlined earlier. To accurately assess the overall effectiveness of the products, the products were tested using black liquors taken from many different sources and retested on separate occasions to determine whether the results were repeatable.

The products were prepared by merely blending the ingredients and heating the blend at a temperature of 145°F. for a time sufficient to dissolve all of the soluble ingredients and to homogeneously mix the insoluble ingredients (e.g. 15 minutes). The compositions were then allowed to cool, after which the lower alkanol, if used, was added and thoroughly mixed in. The product was then ready for testing or use.

| Ingredient | Product of Example 1 | Product of Example 2 | Product of Example 3 | Product of Example 4 | Product of Example 5 |
|---|---|---|---|---|---|
| Tallow Fatty Acid (HCP) | 10 | 10 | 10 | — | 10 |
| Fatty Alcohol Mixture (Alfol 1618C) | 8 | 8 | — | 8 | 8 |
| Polyethylene Glycol (400) Monooleate | — | 2 | 2 | 2 | 2 |
| Polyethylene Glycol (26) Sorbitol Hexaoleate | 2 | — | 2 | 2 | 2 |
| Petroleum Sulfonic Acid (Sodium Salt: Petronate HL) | 0.5 | 0.5 | — | — | 0.5 |
| Isopropanol | 6 | 6 | — | — | 6 |
| Mineral Oil (Tufflo 100) | 73.5 | 73.5 | 86 | 88 | — |
| Mineral Oil (Tufflo 105) | | | | | 71.5 |

TABLE 1

| Product Tested If Any | Black Liquor Source | Treatment (ppm) If Any | Percentage Tall Oil After Treatment |
|---|---|---|---|
| None | Alabama Mill | None | 0.83 |
| Example 1 Product | Alabama Mill | 100 | 0.65 |
| Example 2 Product | Alabama Mill | 100 | 0.70 |
| None | Louisanna Mill | None | 1.11 |
| Example 3 Product | Louisanna Mill | 100 | 0.89 |
| Example 4 Product | Louisanna Mill | 100 | 0.84 |
| None | Alabama Mill | None | 1.15 |
| Example 3 Product | Alabama Mill | 100 | 0.52 |
| None | Louisanna Mill | None | 1.27 |
| Example 3 Product | Louisanna Mill | 100 | 1.02 |
| None | Alabama Mill | | 1.21 |
| Example 4 Product | Alabama Mill | 100 | 1.04 |
| Example 5 Product | Alabama Mill | 100 | 0.97 |

The foregoing data established quite demonstratively that products of the invention were effective for the purpose.

In order to establish the overall effectiveness of products which fall under the inventive scope, the products described in Examples 6 and 7 were produced and extensively tested as described, the method of producing the subject compositions was that as earlier described. The test results are recorded in TABLES 2 and 3 which follow the description of the products.

EXAMPLE 6

The composition of this Example contained the following ingredients in the respective percentages:

10.0% tallow fatty acid (HCP, a mixture of primarily palmitic, stearic and oleic acids)

8.0% Alfol 1618C (a mixture of 62% -$C_{18}$- fatty alcohol and 35% - $C_{16}$ fatty alcohol, 3% of similar type alcohols - commonly known as tallow alcohol 0.5% petroleum sulfonic acid, (sodium salt of/Petronate HL) having a molecular weight ranging from 400 to 460, an empirical formula of $C_{26}H_{42}SO_3Na$ and an $SO_3$ content of about 17.5%

2.0% polyethylene glycol (26) sorbitol hexaoleate 2.0% polyethylene glycol (400) monooleate 6.0% isopropanol 71.5% Tufflo 100 (a parafinic oil having an SUS of 105 at 100°F)

EXAMPLE 7

Composition of Example 6 with the exception that Adol 54 (mixture of primarily $C_{18}$ and $C_{16}$ fatty alcohols) was substituted for Alfol 1618C.

TESTS

The black liquor samples which were tested in accordance with the procedure outlined were derived from mills as designated in the Tables which follow.

TABLE 2

(TO) Percentage Tall Oil = % Tall Oil Based Upon Solids After Skimming Soap —(Buckeye Test) Product of Example 6

| Black Liquor Source | Mill "A" Louisanna % TO | Mill "B" Louisanna % TO | Mill "C" So. Carolina TO | Mill "D" Georgia % TO | Mill "E" So. Carolina % TO | Mill "F" Georgia % TO | Mill "G" No. Carolina % TO | Mill "H" Maryland % TO |
|---|---|---|---|---|---|---|---|---|
| Additive Dosage (ppm) | | | | | | | | |
| None | 2.400 | 0.705 | 0.452 | 1.667 | 1.010 | 0.503 | 0.310 | 1.312 |
| 50 | — | 0.532 | 0.295 | 1.43 | 0.798 | 0.463 | 0.276 | 1.083 |
| 100 | — | — | — | 1.43 | 0.742 | 0.505 | — | 1.069 |
| 200 | 0.550 | — | — | — | — | — | — | 0.971 |
| None | — | — | 1.907* | | 1.050 | 0.543 | | |
| 50 | — | — | 1.745 | | 0.898 | 0.482 | | |
| 100 | — | — | | | | 0.374 | | |

The recorded data established that in all cases except one (100 ppm — in Mill F), the invention product quite successfully functioned to increase the amount of tall oil produced, and accordingly the amount of tall oil soap separated from the black liquors. With respect to Mill F and the 100 ppm feed, it is obvious that something was in error (calculation, performance of tests, etc.) since it is most unlikely to have more tall oil soap after treatment than in the original. At best it could be concluded that the additive had no effect. However the tests performed at a later date established that the product was quite effective at the 100 ppm level using Mill F black liquor.

FIELD TRIAL

An in-mill trial was performed in an Alabama pine kraft mill to establish the on-stream effectiveness of the product of Example 6.

In this mill the actual black liquor (24.6% solids) flow rate during the trials was approximately 749 gallons per minute. The density of the liquor was approximately 9.2 lb/gal. Total 24 hour flow was 9.92 million gallons.

The point of additive was a tap on the intake line of a centrifugal pump feeding the skimmer. This point was chosen to insure complete dispersion of the product before reaching the skimmer. Samples of skimmer inflow and outflow were obtained for Buckeye evaluations at the end of 3 hours, 5 hours and 7 hours. These times coincided with the end of feed of 200 ppm, 100 ppm and 50 ppm of the product of Example 6. The black liquor samples obtained were diluted with 4 parts water to prevent soap separation.

The results of the test establish conclusively that the additive was quite effective in permitting the separation of higher percentages of tall oil soap. Over a period of the test the average efficiency of the skimming operation without additive was approximately 57.5%.

More specifically the results were as follows:

TABLE 3

| Feed Rate (ppm) Product of Example 6 | TPD* of Crude Tall Oil as Calculated From Intake Sample | TPD* of Crude Tall Oil as Calculated From Outflow Sample | Efficiency (%) | Increased Efficiency |
| --- | --- | --- | --- | --- |
| None | — | — | 57.5 | — |
| 200 | 48.25 | 5.09 | 89.45 | 31.95 |
| None | — | — | 57.5 | — |
| 100 | 48.62 | 4.96 | 89.81 | 32.31 |
| None | — | — | 57.5 | — |
| 50 | 39.82 | 6.82 | 82.87 | 25.37 |

*TPD = Calculated Tons Per Day.

This increase in tall oil soap recovery at current market values represented added revenue to the mill of from 1,000 to 2,000 dollars per day. Accordingly the true merit of the invention was solidly established.

A second field trial was conducted utilizing the Product of Example 7. The black liquor in this instance contained approximately 24.6% solids and had a flow rate of approximately 750 gallons per minute. Utilizing mechanical skimming techniques, the efficiency averaged approximately 57.5. The product of Example 2 was fed at a ratio of 100 ppm over a period of 15 days. The results recorded were those as set forth in Table 4. The table sets forth the data determined by both mill personnel and personnel from applicant's assignee.

TABLE 4

Extend Trail Product of Example 7 at Alabama Mill

| | Mill Buckeyes % Tall Oil on B. L. Solids | | | Buckeyes % Tall Oil on B.L. Solids | | |
| --- | --- | --- | --- | --- | --- | --- |
| Date | Inflow | % Outflow | Eff. | Inflow | % Outflow | Eff. |
| 5/1/73 | 5.01 | .96 | 81 | 3.88 | 0.80 | 79 |
| 5/2/73 | 2.77 | .89 | 68 | 2.83 | 0.85 | 70 |
| 5/3/73 | 3.89 | 1.19 | 69 | 3.26 | 0.98 | 70 |
| 5/7/73 | 3.13 | .94 | 70 | 3.12 | 1.21 | 61 |
| 5/8/73 | 3.30 | .95 | 71 | 3.30 | .95 | 72 |
| 5/9/73 | | .90 | | 3.82 | .77 | 80 |
| 5/10/73 | | .67 | | 3.35 | .77 | 77 |
| 5/11/73 | | .81 | | 4.25 | .81 | 81 |
| 5/14/73 | | .66 | | 3.67 | .63 | 83 |
| 5/15/73 | | .64 | | 4.13 | .71 | 83 |

The enhanced efficiency was quite impressive to mill personnel since it represented revenues which were previously unattainable.

Having thus described the invention which is claimed as:

1. A composition for use in tall oil separation comprising on a percentage weight ratio basis
   i. from about 0.1% to about 15% of a product derived by the esterification of an ethoxylated sugar alcohol having a mole ratio of 5 to 40 moles of ethylene oxide per mole of sugar by an unsaturated $C_{14}-C_{20}$ fatty acid or mixture thereof
   ii. from about 0.5% to about 30% of at least one tallow fatty acid, or tallow fatty alcohol, having from about 12 to 20 carbon atoms
   iii. a material in the weight ratio specified selected from the group consisting of:
      a. from about 0.1% to about 15% of a fatty acid mono or diester of a polyethylene glycol, said fatty acid having from about 14 to 18 carbon atoms,
      b. from about 0.3% to about 20% of a petroleum sulfonic acid, or water soluble salt thereof, having a molecular weight of from about 400 to 900, and
      c. mixtures of (a) and (b), each of which is present in the mixture in an amount sufficient to provide the appropriate weight ratio for the composition; and
   iv. from about 65 to about 98% of a water-insoluble liquid selected from the group consisting of vegetable oils, aliphatic hydrocarbons, alicyclic hydrocarbons, aromatic hydrocarbons, halogenated aliphatic hydrocarbons, halogenated alicyclic hydrocarbons, halogenated aromatic hydrocarbons, and long chain amines.

2. A composition according to claim 1 which contains from about 0.5% to about 8% of a lower alkanol solublizing agent.

3. A composition according to claim 1 wherein:
the tallow fatty acid or alcohol has from about 16 to 18 carbon atoms and is present in an amount of from about 2% to about 15%;
the petroleum sulfonic acid is present and has a molecular weight of from about 400 to 500 and is present in an amount of from about 1.0% to about 8%;
the ethoxylated sugar alcohol is esterified wtih oleic acid and is present in an amount of from 0.5 to 12%;
the polyethylene glycol ester is present and is polyethylene glycol 600 dioleate and is present in an amount of from about 0.5% to 12%;
the organic liquid is a refined mineral oil and is present in an amount of about 75% to about 93%.

4. A composition according to claim 3 which contains from about 2% to about 6% of isopropanol.

5. A composition according to claim 3 wherein:
the tallow acid or alcohol is a mixture of stearic, palmitic and oleic acids or alcohols and is present in an amount of about 2%;
the petroleum sulfonic acid is present in an amount of about 2%;
the product is polyethylene glycol (26) sorbitol hexaoleate and is present in an amount of about 2%;
said glycol ester is present in an amount of about 8%; and
said mineral is paraffinic and is present in an amount of about 83%.

6. A composition according to claim 5 which contains about 5% of isopropanol.

7. A method for enhancing the separation of tall oil soap from black liquors derived from alkaline pulping operations which comprises adding thereto an amount effective for the purpose of a composition comprising:
i. from about 0.1% to about 15% of a product derived by the esterification of an ethoxylated sugar alcohol having a mole ratio of 5 to 40 moles of ethylene oxide per mole of sugar by an unsaturated $C_{14}-C_{20}$ fatty acid or mixture thereof
ii. from about 0.5% to about 30% of at least one tallow fatty acid, or tallow fatty alcohol, having from about 12 to 20 carbon atoms
iii. a material in the weight ratio specified selected from the group consisting of:
a. from about 0.1% to about 15% of a fatty acid mono or diester of a polyethylene glycol, said fatty acid having from about 14 to 18 carbon atoms,
b. from about 0.3% to about 20% of a petroleum sulfonic acid, or water soluble salt thereof, having a molecular weight of from about 400 to 900, and
c. mixtures of (a) and (b), each of which is present in the mixture in an amount sufficient to provide the appropriate weight ratio for the composition
iv. from about 65 to about 98% of a water-insoluble liquid selected from the group consisting of vegetable oils, aliphatic hydrocarbons, alicyclic hydrocarbons, aromatic hydrocarbons, halogenated aliphatic hydrocarbons, halogenated alicyclic hydrocarbons, halogenated aromatic hydrocarbons, and long chain amines.

8. A method according to claim 7 wherein the composition contains from about 0.5% to about 8% of a lower alkanol solubilizing agent.

9. A method according to claim 7 wherein
the tallow fatty acid or alcohol has from about 16 to 18 carbon atoms and is present in an amount of from about 2% to 15%;
the petroleum sulfonic acid is present and has a molecular weight of from about 400 to 500 and is present in an amount of from about 1.0% to about 8%,
the ethoxlated sugar alcohol is esterified with oleic acid and is present in the amount of from 0.5 to 12%;
the polyethylene glycol ester is present and is polyethylene glycol 600 dioleate and is present in an amount of from about 0.5% to 12%;
the organic liquid is a refined mineral oil and is present in an amount of about 75% to about 93%.

10. A method according to claim 9 which contains from about 2% to about 6% of isopropanol.

11. A method according to claim 9 wherein:
the tallow acid alcohol is a mixture of stearic, palmitic and oleic acids or alcohols and is present in an amount of about 2%;
the petroleum sulfonic acid is present in an amount of about 2%;
said glycol ester is present in an amount of about 8%, and
said mineral oil is paraffinic and is present in an amount of about 83%, and
the product is polyethylene glycol (26) sorbitol hexaoleate and is present in an amount of about 2%.

12. A method according to claim 9 wherein the composition is added to the black liquor in an amount of from about 10 to about 1000 parts per million parts of black liquor.

13. A method according to claim 10 wherein the composition is added to the black liquor in an amount of from about 10 to about 1000 parts per million parts of black liquor.

14. A method according to claim 12 wherein the composition is added to the black liquor after it has been concentrated to between 21 and 25% solids.

* * * * *